US012270926B2

(12) United States Patent
Bradshaw

(10) Patent No.: US 12,270,926 B2
(45) Date of Patent: Apr. 8, 2025

(54) TECHNOLOGIES FOR DETERMINING LOCATION OF A TELEMATICS DEVICE DURING COMMUNICATION MODE SWITCHING

(71) Applicant: CalAmp Corp., Irvine, CA (US)

(72) Inventor: Robert Bradshaw, Carlsbad, CA (US)

(73) Assignee: CalAmp Corp., Carlsbad, CA (US)

( * ) Notice: Subject to any disclaimer, the term of this patent is extended or adjusted under 35 U.S.C. 154(b) by 246 days.

(21) Appl. No.: 17/826,694

(22) Filed: May 27, 2022

(65) Prior Publication Data

US 2023/0384411 A1 Nov. 30, 2023

(51) Int. Cl.
*G01S 5/02* (2010.01)

(52) U.S. Cl.
CPC .......... *G01S 5/0264* (2020.05); *G01S 5/0294* (2013.01)

(58) Field of Classification Search
CPC .... G01S 5/0264; G01S 5/0294; G01S 5/0244; G01S 19/14; G01S 19/396; G01S 19/49
See application file for complete search history.

(56) References Cited

U.S. PATENT DOCUMENTS

| | | |
|---|---|---|
| 5,365,450 A | 11/1994 | Schuchman et al. |
| 5,396,540 A | 3/1995 | Gooch |
| 5,515,419 A | 5/1996 | Sheffer |
| 5,544,225 A | 8/1996 | Kennedy et al. |
| 5,587,715 A | 12/1996 | Lewis |
| 5,724,243 A | 3/1998 | Westerlage et al. |
| 5,712,899 A | 12/1998 | Pace, II |
| 5,874,889 A | 2/1999 | Higdon et al. |
| 5,890,061 A | 3/1999 | Timm et al. |
| 5,918,180 A | 6/1999 | Dimino |
| 5,959,577 A | 9/1999 | Fan et al. |
| 5,960,337 A | 9/1999 | Brewster et al. |
| 5,986,543 A | 11/1999 | Johnson |
| 6,032,054 A | 2/2000 | Schwinke |
| 6,049,718 A | 4/2000 | Stewart |
| 6,091,956 A | 7/2000 | Hollenberg |
| 6,131,067 A | 10/2000 | Girerd et al. |
| 6,199,045 B1 | 3/2001 | Giniger et al. |
| 6,320,535 B1 | 11/2001 | Hillman et al. |
| 6,339,745 B1 | 1/2002 | Novik |
| 6,347,281 B1 | 2/2002 | Litzsinger et al. |

(Continued)

OTHER PUBLICATIONS

PCT Search Report and Written Opinion completed Jul. 21, 2023 in application PCT/US2023/023655 (10 pages).

*Primary Examiner* — Ig T An
(74) *Attorney, Agent, or Firm* — Barnes & Thornburg, LLP

(57) ABSTRACT

Technologies for determining the location of a telematics device during communication mode switching of the telematics device include switching a communication processor of the telematics device between a location mode and a data mode. In the location mode, the communication processor is configured to receive location data from a location beacon system and determine a present location of the telematics device. In the data mode, the communication processor is configured to transmit and receive data communications from a remote computer system(s). While in the data mode, the telematics device may estimate its location based on a last determined present location and inertial sensor data received from inertial sensors of the telematics device using dead reckoning.

17 Claims, 9 Drawing Sheets

(56) References Cited

U.S. PATENT DOCUMENTS

| | | | |
|---|---|---|---|
| 6,611,755 B1 * | 8/2003 | Coffee | B28C 9/00 |
| | | | 455/526 |
| 6,677,894 B2 | 1/2004 | Sheynblat et al. | |
| 6,847,825 B1 | 1/2005 | Duvall et al. | |
| 6,876,858 B1 | 4/2005 | Duvall et al. | |
| 2006/0212179 A1 | 9/2006 | Phillips et al. | |
| 2007/0182628 A1 | 8/2007 | Pomerantz et al. | |
| 2010/0036613 A1 * | 2/2010 | Zeng | G01C 21/165 |
| | | | 701/510 |
| 2011/0184644 A1 * | 7/2011 | McBurney | G01S 19/47 |
| | | | 701/532 |
| 2012/0140688 A1 | 6/2012 | Hering et al. | |
| 2014/0232593 A1 * | 8/2014 | Varoglu | G01S 19/49 |
| | | | 342/357.28 |
| 2015/0281910 A1 | 10/2015 | Choudhury et al. | |
| 2016/0093216 A1 | 3/2016 | Lee et al. | |
| 2016/0146615 A1 | 5/2016 | Abhishek | |
| 2016/0300404 A1 | 10/2016 | Harter et al. | |
| 2017/0005202 A1 | 1/2017 | Kobayashi et al. | |
| 2018/0302228 A1 | 10/2018 | Hergesheimer | |
| 2019/0037362 A1 | 1/2019 | Nogueira-Nine | |

\* cited by examiner

TECHNOLOGIES FOR DETERMINING LOCATION OF A TELEMATICS DEVICE DURING COMMUNICATION MODE SWITCHING

FIELD OF THE DISCLOSURE

The present disclosure relates generally to telematics and associated telematics devices and, more particularly, to telematics devices having multiple communication modes.

BACKGROUND

Telematics involves the integrated use of telecommunications and informatics, particularly for application in vehicles and other assets. Telematics functionality may include, but is not limited to, recording vehicle information, emergency warning systems, crash prediction and detection, navigation functionality, safety warnings, fleet and asset management, and automated driving assistance. Vehicle telematics devices may process and transmit telematics data and other messages generated by a vehicle and connected devices. For example, the telematics data may be produced by sensors, controllers, and/or other peripheral devices located on the vehicle and/or within the telematics device itself.

To perform the above-described functionality, many telematics devices are configured to communication with other remote computer devices (e.g., a telematics server or fleet management computer), as well as navigation systems to provide location determination and navigation support. To do so, some telematics devices include communication systems capable contemporaneously transmitting/receiving message data and receiving location data. However, to reduce costs, power demands, and complexity, some telematics devices may include communication systems having non-contemporaneous modes of communication, which requires the telematics device to either selectively transmit/receive message data or to receive location data. Such multiple modes of communication can decrease the communication efficiency of the telematics device and limit the overall functionality. For example, while transmitting/receiving messages data, the determined location of the telematics device based on the location data ages and can become inaccurate over time.

SUMMARY

According to an aspect of the present disclosure, a telematics device may include a plurality of inertial sensors, a location antenna, a data antenna, a communication subsystem, and a location determination manager. The plurality of inertial sensors may be configured to sense inertial characteristics of the telematics device and produce inertial sensor data indicative of the sensed inertial characteristics. The location antenna may be configured for receiving location data from a location beacon system. The data antenna may be configured for communications with a remote computer system. The communication subsystem may include a communication processor electrically coupled to each of the data antenna and the location antenna. The communication processor may have multiple modes of operation including (i) a location mode in which the communication processor is configured to receive and process location data from the location beacon system using the location antenna and (ii) a data mode in which the communication processor is configured to transmit and receive data communications from the remote computer system using the data antenna. Additionally, the communication subsystem may be configured to control the switching of the communication processor between the location mode and the data mode. The location determination manager may be configured to determine a present location of the telematics device based on the location data received from the location beacon system while the communication processor is in the location mode and to determine an estimated location of the telematics device based on a last determined present location of the telematics device and the inertial sensor data using a dead reckoning algorithm while the communication processor is in the data mode. Additionally, the communication subsystem may be configured to switch the communication processor from the data mode to the location mode in response to a determination that an error associated with the estimated location is greater than a threshold error.

In some embodiments, the plurality of inertial sensors may include an accelerometer sensor and a gyroscope sensor. Additionally, in some embodiments, to determine the estimated location of the telematics device may include to determine the estimated location of the telematics device based on the last determined present location of the telematics device and the inertial sensor data using a Kalman filter while the communication processor is in the data mode. In such embodiments, to determine the estimated location using the Kalman filter may include to determine the error associated with the estimated location.

In some embodiments, the telematics device may further include a data communication manager configured to (i) cache messages to be transmitted to the remote computer system while the communication processor is in the location mode and (ii) transmit, via the communication subsystem, the cached messages in response to the communication processor being switched to the data mode. Additionally, in some embodiments, the communication subsystem may be further configured to store, in response to the mode of operation of the communication processor being switched to the data mode, the determined present location of the telematics device as the last determined present location. The communication subsystem may also be configured to switch the communication processor to the location mode in response to receipt of a request for the location mode from an application executed on the telematics device and to switch the communication processor to the data mode in response to receipt of a request for the data mode from the application.

Additionally, in some embodiments, to control the switching of the communication processor between the location mode and the data mode may include to determine a switching duty cycle between the location mode and the data mode of the communication processor and to switch the communication processor between the location mode and the data mode based on the switching duty cycle. For example, the duty cycle may include a greater than 50% duty cycle for the location mode. Additionally, in some embodiments, to switch the communication processor between the location mode and the data mode may include to set a timer for the location mode based on the switching duty cycle, switch the communication processor to the location mode, determine whether the timer for the location mode has expired, and in response to a determination that the timer for the location mode has expired, (i) set the timer for the data mode based on the switching duty cycle and (ii) switch the communication processor to the data mode. Furthermore, in some embodiments, to switch the communication processor between the location mode and the data mode may also include to determine whether the timer for the data mode has expired, and in response to a determination that the timer for the data mode has expired, (i) set the timer for the location mode based on the switching duty cycle and (ii) switch the communication processor to the location mode.

In some embodiments, the telematics device may also include a message bus manager configured to receive a request for the data mode from an application executed by the telematics device. In such embodiments, the request may include a requested duration of the data mode and the communication subsystem may be further configured to set, in response to the request, the timer for the data mode to the requested duration. Additionally, in such embodiments, the communication subsystem may be further configured to determine whether the requested duration is greater than a maximum duration and set the timer for the data mode to the maximum duration in response to a determination that the requested duration is greater than the maximum duration. Furthermore, in such embodiments, to receive a request for the data mode may include to receive a plurality of requests for the data mode from one or more applications executed by the telematics device. Each request of the plurality of requests may include a requested duration of the data mode. Additionally, the message bus manager may be further configured to determine a requested duration having the longest duration from the plurality of requests, and the communication subsystem may be further configured to set the timer for the data mode to the requested duration having the longest duration.

According to another aspect of the present disclosure, a method for switching between communication modes of a telematics device may include receiving, from a plurality of inertial sensors, inertial sensor data indicative of inertial characteristics of the telematics device and switching, by a communication subsystem of the telematics device, a communication processor of the telematics device between a location mode and a data mode. The communication processor may include multiple modes of operation including (i) the location mode in which the communication processor is configured to receive and process location data from the location beacon system using a location antenna of the telematics device and (ii) the data mode in which the communication processor is configured to transmit and receive data communications from the remote computer system using a data antenna of the telematics device. The method may also include determining, by the telematics device, a present location of the telematics device based on the location data received from the location beacon system while the communication processor is in the location mode and determining, by the telematics device, an estimated location of the telematics device based on a last determined present location of the telematics device and the inertial sensor data using a dead reckoning algorithm while the communication processor is in the data mode. The method may further include switching, by the communication subsystem, the communication processor from the data mode to the location mode in response to a determination that an error associated with the estimated location is greater than a threshold error.

In some embodiments, receiving the inertial sensor data may include receiving accelerometer data form an accelerometer sensor of the telematics device and receiving gyroscope data from a gyroscope sensor of the telematics device. Additionally, in some embodiments, determining the estimated location of the telematics device may include determining the estimated location of the telematics device based on the last determined present location of the telematics device and the inertial sensor data using a Kalman filter while the communication processor is in the data mode. In such embodiments, determining the estimated location using the Kalman filter may include determining the error associated with the estimated location.

Additionally, in some embodiments, the method may further include caching, by the telematics device, messages to be transmitted to the remote computer system while the communication processor is in the location mode and transmitting, by the communication subsystem, the cached messages in response to the communication processor being switched to the data mode. The method may also include storing, in response to the mode of operation of the communication processor being switched to the data mode, the determined present location of the telematics device as the last determined present location.

In some embodiments, switching the communication processor of the telematics device between a location mode and a data mode may include switching, by the communication subsystem, the communication processor to the location mode in response to receipt of a request for the location mode from an application executed on the telematics device and switching the communication processor to the data mode in response to receipt of a request for the data mode from the application. Additionally, in some embodiments, switching the communication processor of the telematics device between a location mode and a data mode may include determining, by the telematics device, a switching duty cycle between the location mode and the data mode of the communication processor and switching, by the communication subsystem, the communication processor between the location mode and the data mode based on the switching duty cycle.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIGS. 3 and 4 is a simplified flow diagram of at least one embodiment of another method for switching communication modes of the telematics device of FIG. 1.

DETAILED DESCRIPTION OF THE DRAWINGS

Figure 1:
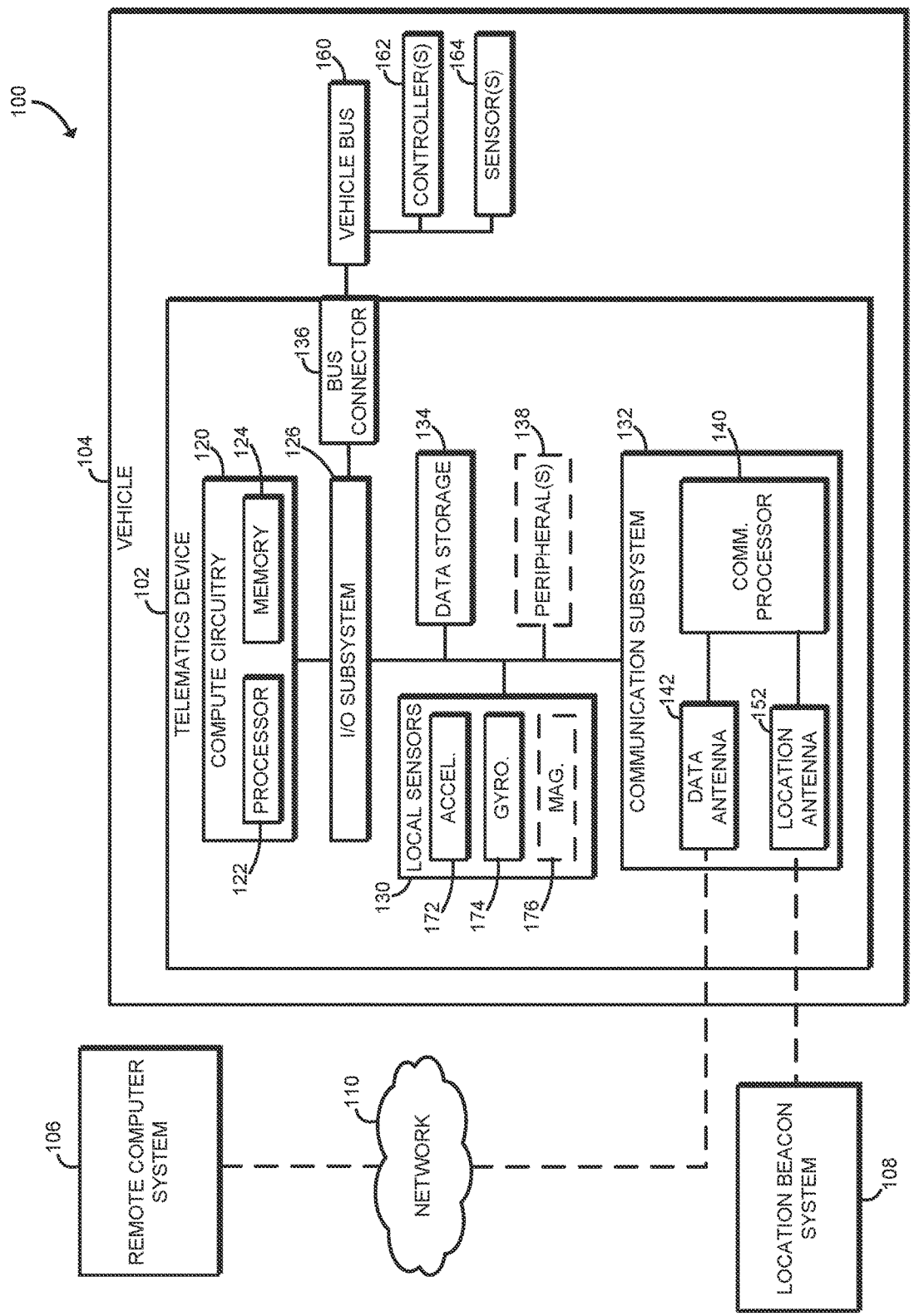
FIG. 1 is a simplified block diagram of at least one embodiment of a telematics system for switching communication modes of a telematics device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative telematics system 100 for facilitating multiple modes of communication of a telematics device includes a telematics device 102 installed in a vehicle 104, a remote computer system(s) 106, and a location beacon system 108. The telematics device 102 is in communication with each of the remote computer system 106 and the location beacon system 108 over a network 110. In use, as described in more detail below, the telematics device 102 is configured to switch between different communication modes including a location mode in which the telematics device 102 is configured to receive and process location data from the location beacon system 108 to determine a present location of the telematics device and provide navigation functions and a data mode in which the telematics device 102 is configured to receive and/or transmit data messages to the remote computer system(s) 106. To do so, the telematics device 102 may use any suitable switching methodology such as switching based on requests for a particular communication mode and/or switching based on a determined duty cycle as discussed in more detail below. It should be appreciated, however, that while the telematics device 102 is in the data mode, the determined location of the telematics device 102 becomes "stale" and inaccurate over time. As such, while in the data mode, the telematics device 102 is configured to estimate its location based on the last determined location (i.e., determined based on the location data) and inertial sensor data received from various sensors of the telematics device 102. Additionally, while in location mode, the telematics device 102 is configured to cache data messages for transmission to the remote computer system(s) 106 (e.g., data messages from applications executed on the telematics device 102) and transmit the cached messages during the next data mode. As such, it should be appreciated that the illustrative telematics device 102 may utilize a lower-cost, more efficient communication processor having non-contemporaneous communication modes while maintaining a high level of functionality and location accuracy.

The illustrative telematics device 102 includes compute circuitry 120, an I/O subsystem 126, local sensors 130, a communication subsystem 132, a data storage device 134, a bus connector 136 and, in some embodiments, one or more peripheral devices 138. Of course, the telematics device 102 may include other or additional components, such as those commonly found in a portable or embedded computer (e.g., various input/output devices), in other embodiments. Additionally, in some embodiments, one or more of the illustrative components may be incorporated in, or otherwise form a portion of, another component.

The compute circuitry 120 may be embodied as any type of device or collection of devices capable of performing various compute functions. In some embodiments, the compute circuitry 120 may be embodied as a single device such as an integrated circuit, an embedded system, a field-programmable-array (FPGA), a system-on-a-chip (SOC), or other integrated system or device. Additionally, in some embodiments, the compute circuitry 120 includes or is embodied as a processor 122 and memory 124. The processor 122 may be embodied as any type of processor capable of performing the functions described herein. For example, the processor 122 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the telematics device 102 such as operating systems, applications, programs, libraries, and drivers.

The compute circuitry 120 is communicatively coupled to other components of the telematics device 102 via the I/O subsystem 126, which may be embodied as circuitry and/or components to facilitate input/output operations with the compute circuitry 120 (e.g., with the processor 122 and/or memory 124) and other components of the telematics device 102. For example, the I/O subsystem 126 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 126 may be incorporated, along with the processor 122, the memory 124, and other components of the telematics device 102, into the compute circuitry 120.

The local sensors 130 may be embodied as any type of sensors located on the telematics device 102 and capable of producing associate data such as inertial data and telematics data. In the illustrative embodiment, the location sensors 130 includes one or more accelerometers 172, one or more gyroscopes 174, and, in some embodiments, one or more magnetometers 176. Each of the accelerometers 172 may be embodied as any sensor, circuitry, and/or other components configured to measure acceleration and/or other motion of the telematics device 102 (e.g., along each of the three-dimensional axes of the telematics device 102). Each of the gyroscopes 174 may be embodied as any sensor, circuitry, and/or other components configured to measure the angular orientation of the telematics device 102 relative to a pre-defined coordinate system. That is, the gyroscope 174 may measure the roll, pitch, and/or yaw of the telematics device 102. Each of the magnetometers 176 may be embodied as any sensor, circuitry, and/or other components configured to measure the magnetic field (e.g., a compass) and/or other information useful in determining the direction in which the telematics device 102 is pointing (e.g., with respect to due North). The telematics device 102 may also include components and/or devices configured to facilitate the use of the sensors 130 (e.g., an inertial measurement unit). Additionally, the telematics device 102 may include additional or other sensors in other embodiments including, for example, micro-electromechanical systems (MEMs), temperature sensors, altitude sensors, pressure sensors, light sensors, and/or other sensors.

The communication subsystem 132 of the telematics device 102 may be embodied as any type of communication circuit, device, or collection thereof, capable of enabling communications between the telematics device 102 and the remote computer system 106 and the location beacon system 108. In the illustrative embodiment, the communication subsystem 132 includes a communication processor 140, which is electrically coupled to a data antenna 142 and to a location antenna 152. The communication processor 140 is embodied as a multi-mode processor capable of multiple modes of operation (i.e., multiple communication modes). For example, in the illustrative embodiment, the communication processor 140 is switchable between a data mode in which the communication processor 140 is configured to receive and/or transmit data messages with the remote computer system 106 via the data antenna 142 and a location or navigation mode in which the communication processor 140 is configured to receive location data/signals from the location beacon system 108 via the location antenna 152. For example, the communication processor 140 may be embodied as, or otherwise include, a multi-mode modem including a cellular transceiver and a GNSS receiver. However, it should be appreciated that the multiple communication modes of the communication processor 140 cannot operate simultaneously. As such, the communication processor 140 is capable of being switched between communication modes to transmit/receive data messages with the remote computer system 106 or receive location data from the location beacon system 108. In communicating with the remote computer system 106, the communication processor 140 may utilize any suitable communication protocol and/or standard including, but not limited to Long-Term Evolution (LTE), 4G LTE, 5G, Wi-Fi (e.g., communications based on the Institute of Electrical and Electronics Engineers (IEEE) 802.11 family), Ethernet, Worldwide Interoperability for Microwave Access (WiMAX), Ethernet, Global System for Mobile Communications (GSM), and/or General Packet Radio Service (GPRS).

The data storage device 134 may be embodied as any type of device or devices configured for short-term or long-term storage of data such as, for example, memory devices and circuits, memory cards, hard disk drives, solid-state drives, or other data storage devices. The data storage device 134 may store various data including programs, scripts, location data, message data, and other types of digital data.

The bus connector 136 may be embodied as any type of vehicle diagnostic connector capable of interfacing with a vehicle bus 160 of the vehicle 104 to receive telemetry data from the components of the vehicle 104 as discussed below. For example, in the illustrative embodiment, the bus connector 136 is embodied as a vehicle diagnostic connector configured to mate with an OBD-II port of the vehicle 104. In other embodiments, however, the telematics device 102 may be directly connected or otherwise coupled to the vehicle bus 160 with a wiring harness or other connector/connections.

As shown, the telematics device 102 is coupled to or otherwise included in a corresponding vehicle 104. The vehicle 104 may be embodied as, without limitation, a heavy truck, a fleet vehicle, a garbage truck, a snow plow, a dump truck, a bus, a light truck, a passenger car, an airplane, a water craft, or other vehicle. Additionally or alternatively, in some embodiments, the telematics device 102 may be coupled to another asset such as a shipping pallet, a tool cage, a restricted access room, a section of the warehouse, or any other device or location that may be monitored or tracked using a telematics device 102. Illustratively, the vehicle 104 is a vehicle, and the telematics device 102 is configured to monitor operating conditions or characteristics of the vehicle 104 and to communicate telematics data indicative of the operating conditions of the vehicle 104 to one or more of the remote computer systems 106 (e.g., to a telematics server).

As discussed above, the illustrative vehicle 104 further includes the vehicle bus 160, which may be coupled to multiple connected devices such as controllers 162 and sensors 164 of the vehicle 104. The vehicle bus 160 may be embodied as a controller area network (CAN) bus, a local area network, a wireless network, or another communications network that allows various components of the vehicle 104 and/or peripheral devices to communicate. As discussed above, the telematics device 102 may be coupled to the vehicle bus 160 via the bus connector 134 or via other mechanisms (e.g., a direct connection).

Each of the controllers 162 may be embodied as an electronic control unit (ECU), an engine controller, a vehicle controller, a microcontroller, or other embedded computing resource of the vehicle 104. Each controller 162 may provide engine telemetry, ignition signals, odometer signals, or other vehicle telemetry data over the vehicle bus 160. Each of the sensors 164 may be embodied as a location sensor (e.g., a GPS receiver), an accelerometer, a gyroscope, a magnetometer, a speed sensor, a temperature sensor, an environmental sensor, a weight sensor, a vehicle- or application-specific sensor such as a snow plow position sensor, a fork lift position sensor, a tire pressure sensor, a door state sensor, or other sensor device configured to provide sensor data over the vehicle bus 160. Although illustrated in FIG. 1 as being coupled to the telematics device 102 via the vehicle bus 160, it should be understood that in some embodiments one or more of the controllers 162 and/or the sensors 164 may be coupled directly to the telematics device 104 via Bluetooth Low Energy (BLE), wireless networking (WiFi), a direct serial connection, or other connection.

The remote computer system(s) 106 may be embodied as any type of computation or computer device capable of communicating with the telematics device 102 via the network 110 and performing the functions described herein, including, without limitation, a server, a rack-mounted server, a blade server, a workstation, a network appliance, a web appliance, a desktop computer, a laptop computer, a tablet computer, a smartphone, a mobile communication device/computer, a consumer electronic device, a distributed computing system, and/or a multiprocessor system. For example, the remote computer system 106 may be embodied as a telematics server, a fleet management computer, an application server, a data analytics server, and/or other type of remote computer device or system. As such, in some embodiments, the remote computer system 106 may be embodied as a "virtual server" formed from multiple computing devices distributed across the network 110 and operating in a public or private cloud. The remote computer system 106 may include components and devices commonly found in a computer or similar computing device, such as a processor, an I/O subsystem, a memory, a data storage device, and/or communication circuitry. Those individual components of the remote computer system 106 may be similar to the corresponding components of the telematics device 102, the description of which is applicable to the corresponding components of the remote computer system 106 and is not repeated herein so as not to obscure the present disclosure.

The location beacon system 108 may be embodied as any type of location/navigation signal source. For example, the location beacon system 108 may be embodied as, or otherwise include without limitation, a Global Navigation Satellite System (GNSS) such as the Global Positioning System (GPS), the Galileo satellite navigation system, and the Global Navigation Satellite System (GLONASS), the BeiDou satellite navigation system, the Quasi-Zenith Satellite System (QZSS), and the Indian Regional Navigation Satellite System (IRNSS). In other embodiments, the location beacon system 108 may be embodied as, or otherwise include, collection of private location beacon towers from which a device's location via triangulation and/or trilateration. Regardless, the location beacon system 108 is configured to transmit location data to the telematics device 102, from which the telematics device 102 can determine its present location and/or provide other navigational functionality.

As discussed in more detail below, the telematics server 102 is configured to communicate with the remote computer system 106 and/or other devices of the telematics system 100 over the network 110. The network 110 may be embodied as any number of various wired and/or wireless networks. For example, the network 110 may be embodied as, or otherwise include, a cellular network, a publicly-accessible, global network such as the Internet, a wired or wireless local area network (LAN), a wired or wireless wide area network (WAN), and/or other network or other data communication infrastructure. To do so, the network 110 may facilitate various data communication specifications and/or protocols including, but not limited to, Long-Term Evolution (LTE), 4G LTE, 5G, Wi-Fi (e.g., communications based on the Institute of Electrical and Electronics Engineers (IEEE) 802.11 family), Worldwide Interoperability for Microwave Access (WiMAX), Ethernet, Global System for Mobile Communications (GSM), and/or General Packet Radio Service (GPRS). As such, the network 110 may include any number of additional devices, such as additional computers, routers, stations, and switches, to facilitate such communications among the devices of the system 100.

Figure 2:
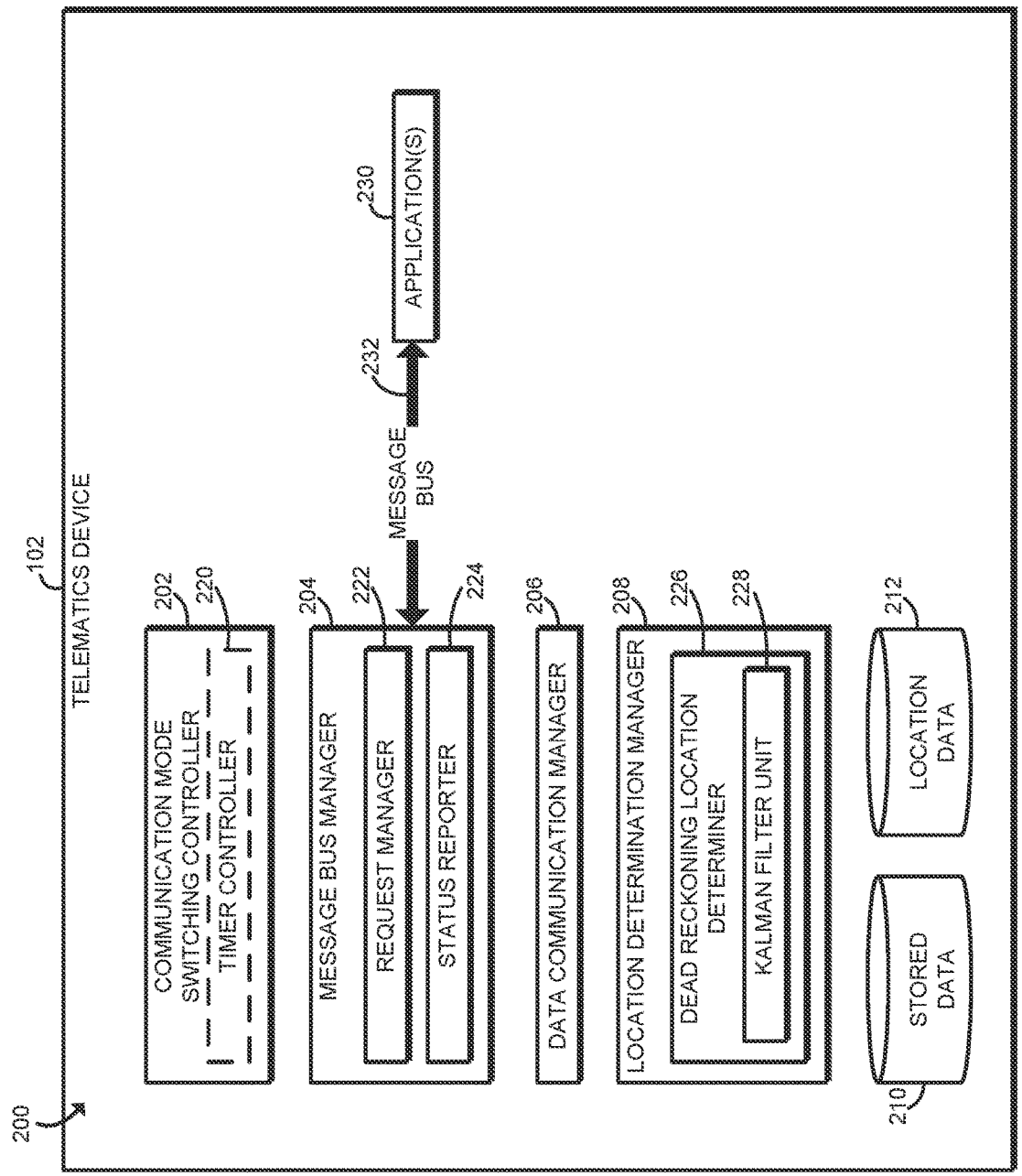
FIG. 2 is a simplified block diagram of an environment that may be established by the telematics device of FIG. 1.

Referring now to FIG. 2, in the illustrative embodiment, the telematics device 102 is configured to establish an environment 200 during operation. The illustrative environment 200 includes a communication mode switching controller 202, a message bus manager 204, a data communication manager 206, and a location determination manager 208. The various components of the environment 200 may be embodied as hardware, firmware, software, or a combination thereof. As such, in some embodiments, one or more of the components of the environment 200 may be embodied as circuitry or a collection of electrical devices (e.g., communication mode switching controller circuitry 202, message bus manager circuitry 204, data communication manager circuitry 206, data and/or location determination manager circuitry 208). It should be appreciated that, in such embodiments, one or more of those components may form a portion of the processor 122, the I/O subsystem 126, and/or other components of the telematics device 102.

The communication mode switching controller 202 is configured to control the switching of the communication processor 140 between the various communication modes (e.g., between the data mode and the location mode). To do so, the communication mode switching controller 202 may utilize any suitable switching scheme. For example, in some embodiments, the communication mode switching controller 202 may switch the communication processor 140 between the location mode and the data mode based on requests for such modes received from applications 230 executed on the telematics device 102 as discussed in more detail below in regard to FIG. 4. Alternatively, in other embodiments, the communication mode switching controller 202 may switch the communication processor 140 between the location mode and the data mode based on a determined switching duty cycle as discussed in more detail below in regard to FIGS. 5 and 6 and described in more detail in U.S. patent application Ser. No. 17/826,698, entitled "Technologies for Switching Between Modes in a Telematics Device" and filed on May 27, 2022, the entirety of which is expressly incorporated herein by reference. In such embodiments, the particular duty cycle selected may be based on various criteria such as the availability and accuracy of the location data received from the location beacon system 108, the requirements of various applications 230 executed on the telematics device 102, and/or other criteria. As such, in some embodiments, the switching duty cycle may be adaptive and changed over time as the associated criteria changes. Furthermore, in some embodiments, the communication mode switching controller 202 selects a duty cycle that provides priority, or otherwise favors, the location mode (e.g., a duty cycle in which the location mode is greater than 50% such as a 80% location mode-20% data mode duty cycle) such that the accuracy of the location of the telematics device 102 is improved.

The message bus manager 204 is configured to manage messages and/or requests received from various applications 230 executed on the telematics device 102. The message bus manager 204 may receive such messages and requests from the applications 230 via a message bus 232. For example, an application 230 may desire to communicate a data message to a remote computer system 106 and pass the data message to the message bus manager 204. In response, the message bus manager 204 may forward the data message to the data communication manager for transmittal to the remote computer system 106. Additionally, the applications 230 may send various requests to the message bus manager 204. To handle such requests, the message bus manager 204 illustratively includes a request manager 222 and a status reporter 224. The request manager 222 handles requests from the various applications 230 for switching communication modes of the communication processor 140. For example, as discussed above, an application 230 may request the communication processor 140 be switched to the data mode indefinitely or for a requested period of time to facilitate urgent or time sensitive communications (e.g., for a firmware update, to communicate an urgent message such as a crash detections, etc.). Alternatively, if the application 230 requires precise or updated location information, the application 230 may request the communication processor 140 be switched to location mode indefinitely or for a requested period of time. Regardless, in response to receipt of such requests, the request manager 222 is configured to communicate the requests to the communication mode switching controller 202 to facilitate the request, as applicable. Similarly, the status reporter 224 handles messages from applications 230 requesting the communication mode status of the communication processor 140 (i.e., which communication mode the communication processor 140 is presently switched to). As such, the status reporter 224 is configured to report the present communication mode of the communication processor 140 to the requesting application 230 via the message bus 232.

The data communication manager 206 handles the receipt and transmission of data messages to the remote computer systems 106. For example, the data communication manager 206 may facilitate the communication of data messages from a remote computer system 106 to an application 230 and/or from an application 230 to a remote computer system 106. If a data message for transmittal to a remote computer system 106 is received from an application 230 while the communication processor 140 is in the location mode, the data communication manager 206 is configured to cache the data message in a stored data database 210. Once the communication processor 140 is switched to the data mode (e.g., based on a received request or the determined duty cycle), the data communication manager 206 is configured to transmit the cached data messages to the designated remoted computer system 106. Additionally, in some embodiments, the data communication manager 206 may be configured to request switching to the data mode based on the amount or number of cached data messages and/or the priority of the cached data messages (e.g., in response to receipt of a high priority data message). For example, if the volume of cached data messages exceeds a maximum threshold or if one or more data messages is marked has a high priority data message (e.g., indicting a crash has occurred), the data communication manager 206 may request the switching of the communication processor 140 to the data mode if the communication processor 140 is presently in the location mode.

The location determination manager 208 is configured to receive location data from the location beacon system 108 while the communication processor 104 is in the location mode and determine a present location of the telematics device 102 (and, therefore, the vehicle 104) and/or other navigation information. The location determination manager 208 stores the received location data and/or determined location/navigation information in a location data database 212. As such, the location data database 212 includes a "last known location" while the communication processor 140 is in the data mode. However, the determined last known location ages and becomes more inaccurate the longer the communication processor 104 remains in the data mode. As such, the location determination manager includes a dead reckoning location determiner 226, which is configured to determine an estimated location of the telematics device 102 based on the last known location (i.e., the last determined location of the telematics device while in the location mode) and sensor data received from the inertial sensors (e.g., from the accelerometer 172, the gyroscope 174, and the magnetometer 176). "Dead reckoning" a process of estimating a device's current position based on a previously determined position, an estimated speed, and an elapsed period of time. Dead reckoning may be implemented using various different methodologies and devices. For example, in the illustrative embodiment, the dead reckoning location determiner 226 includes a Kalman filter unit 228, which utilizes a Kalman filter to determine the estimated positon and an associated error of the estimated position based on the last determined location of the telematics device 102 (as determined during the last location mode) and the sensor data received from the accelerometer 172 and from the gyroscope 174 while the communication processor 140 is in the data mode.

Figure 7:
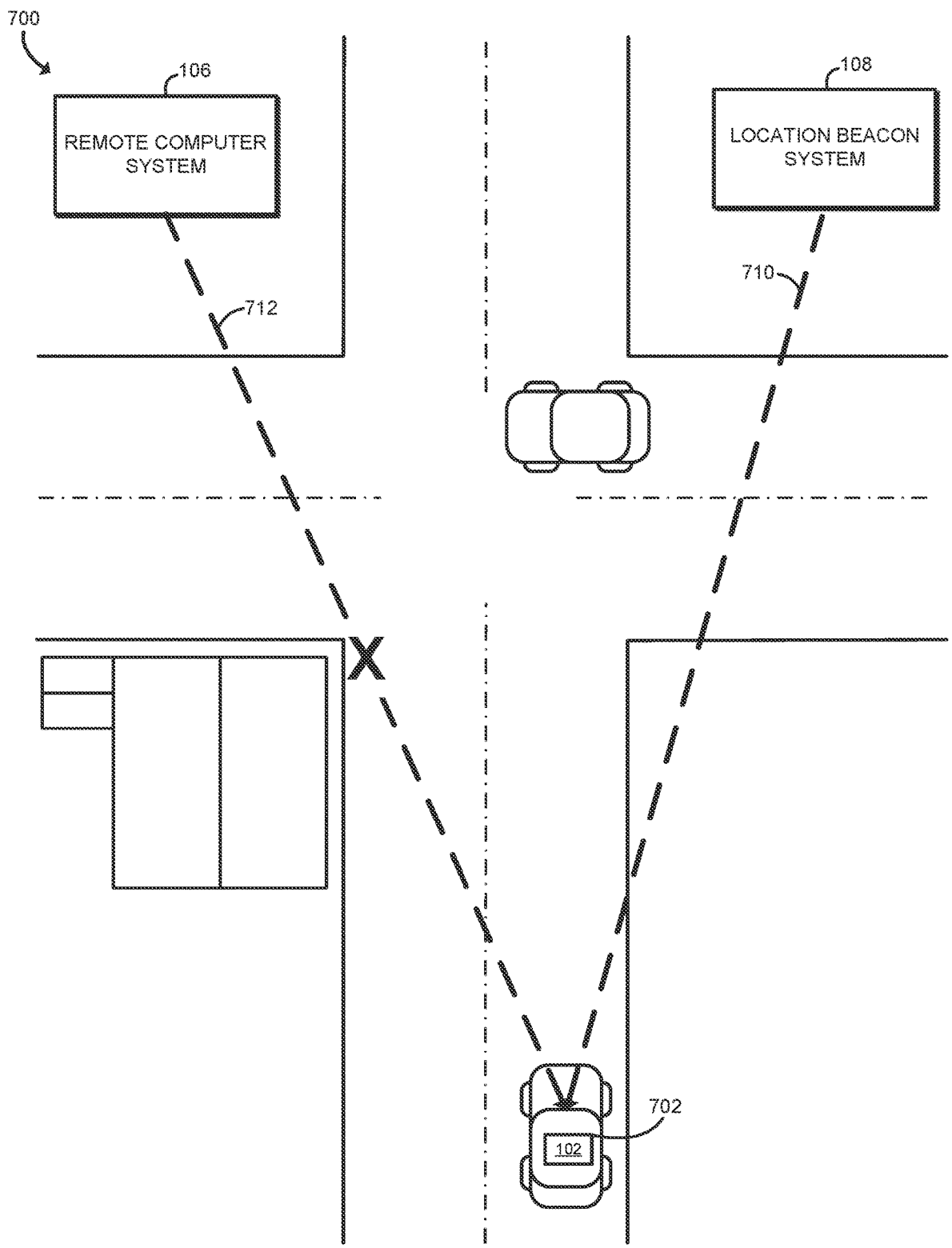
FIGS. 7-9 are illustrations of a vehicle including the telematics device of FIG. 1 traveling along a roadway while the telematics device is switched between the different communication modes.

As discussed above, the communication subsystem 132 is configured to switch the communication processor 140 between the location mode and data mode based on a particular switching scheme (e.g., based on requests or a switching duty cycle). Again, however, when the communications processor 140 is in the data mode, the determined location of the telematics device begins to age and become inaccurate do to, for example, movement of the vehicle 104. For example, the vehicle 104 having the telematics device 102 installed therein is shown traversing a roadway in FIG. 7. During the timeframe shown in FIG. 7, the communication processor 140 of the telematics device 102 is in the location mode. As such, the telematics device 102 maintains a communication link 710 with the location beacon system 108 and determines the present location of the telematics device 102 (and, therefore, of the vehicle 104) based on the location data received from the location beacon system 108. However, the telematics device 102 does not have a communication link 712 with the remote computer system(s) as indicated in FIG. 7 by the "X."

Figure 8:
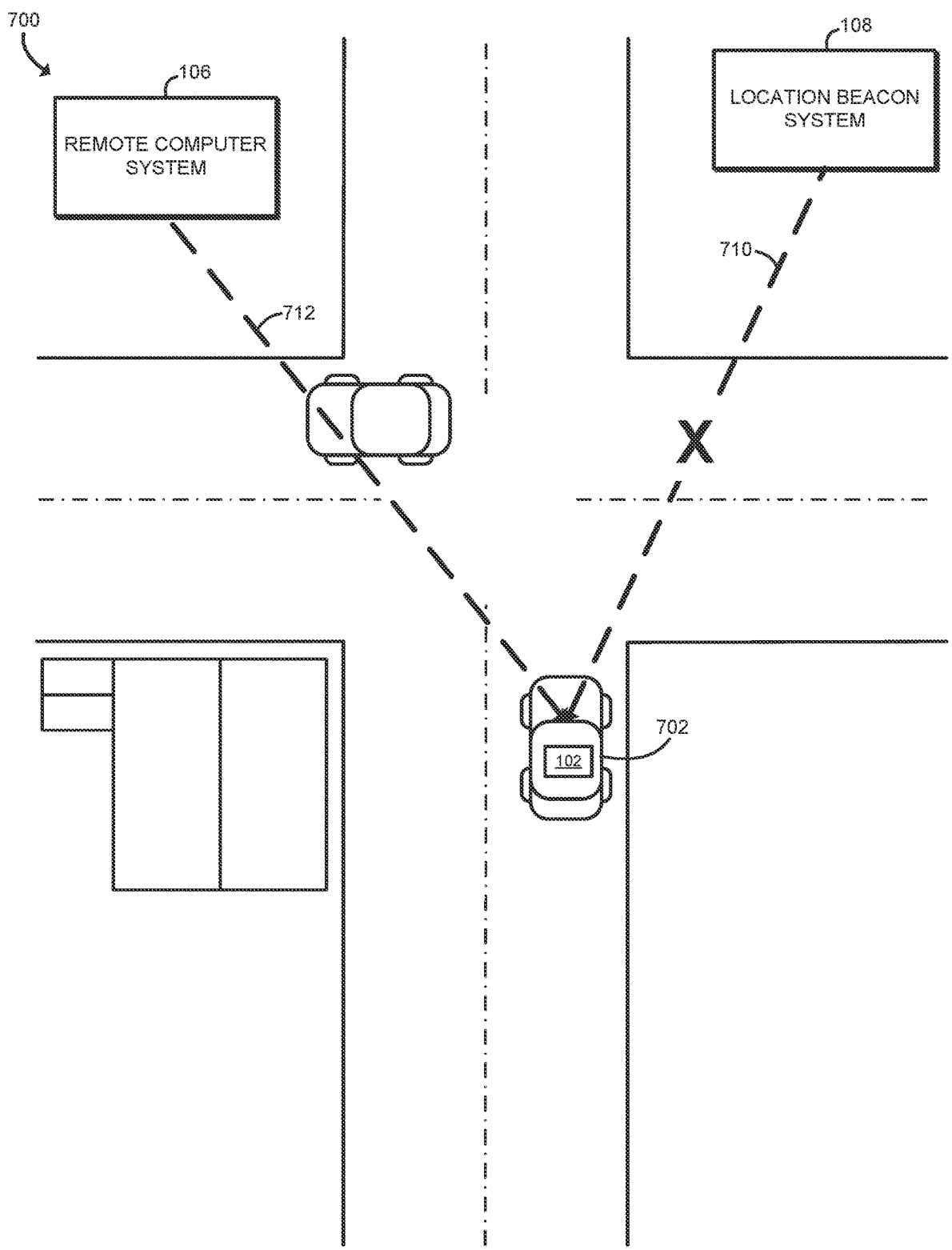

In FIG. 8, the vehicle 104 has traveled farther down the roadway, and the communication processor 140 has been switched to the data mode. As such, the communication link 710 with the location beacon system 108 is dropped as shown in FIG. 8 by the "X" and the communication link 712 with the remote computer system 106 is established. Because the telematics device 102 is no longer receiving the location data from the location beach system 108 during the data mode, the last determined location of the telematics device 102 will age and become more inaccurate over time. As such, as discussed herein, the telematics device 102 is configured to estimate the present location of the telematics device 102 (and, therefore, of the vehicle 104) based on the last determined location and the sensor data from the accelerometer 172 and from the gyroscope 174 (and, in some embodiments, from the manometer 176) using the dead reckoning location determiner 226.

Figure 9:
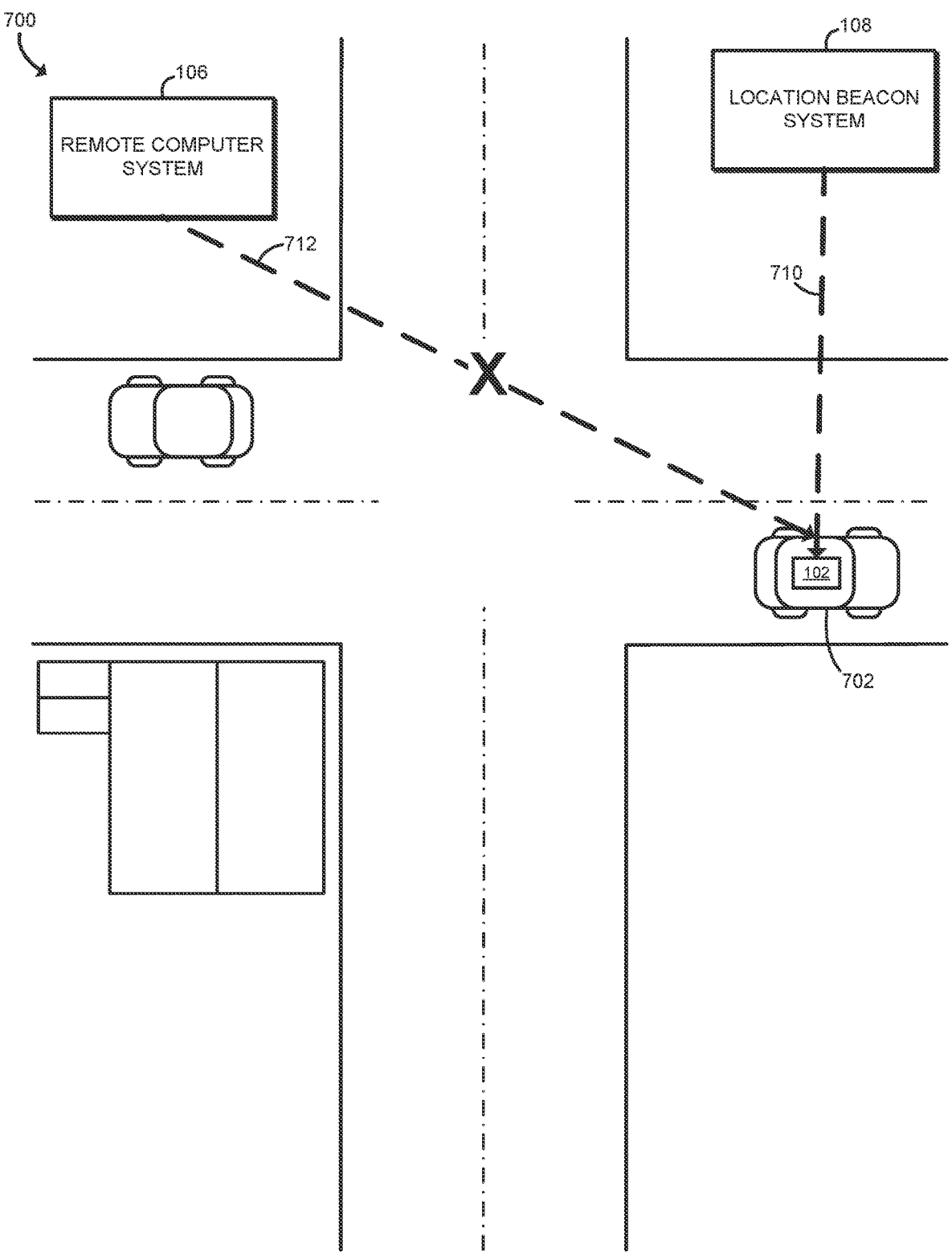

In FIG. 9, the vehicle 104 has turned onto a cross-roadway, and the communication processor 140 has been switched to the location mode again. As such, the communication link 712 with the remote computer system 106 is dropped as shown in FIG. 9 by the "X" and the communication link 710 with the location beacon system 108 is reestablished. The present location is now updated by determining the location of the telematics device 102 based on the new location data received from the location beacon system 108. In this way, the location of the telematics device 102 and the vehicle 104 can be maintained across the switching of the communication modes of the telematics device 102.

Figure 3:
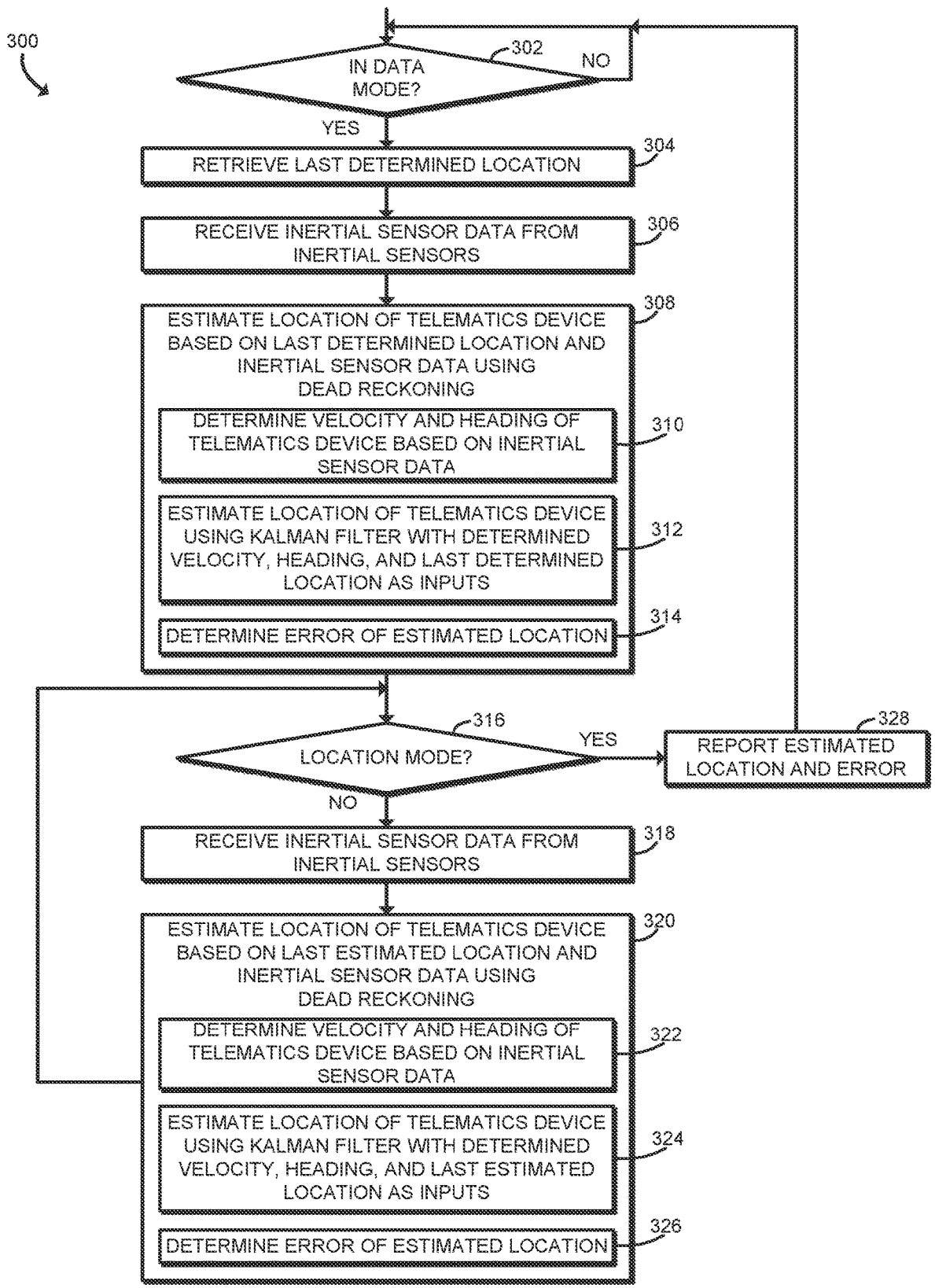
FIG. 3 is a simplified flow diagram of at least one embodiment of a method for estimating a location of the telematics device while the telematics device is in a data mode of operation.

To do so, in some embodiments, the telematics device 102 may execute a method 300 for estimating the location of the telematics device 102 while the telematics device 102 is in a data mode as shown in FIG. 3. It should be appreciated that, in some embodiments, the operations of the method 300 may be performed by one or more components of the environment 204 of the telematics device 104 as shown in FIG. 2.

The method 300 begins with block 302, in which the telematics device 102 determines whether the communication processor 140 is in the data mode and, as such, location data from the location beacon system 108 is unavailable. If so, the method 300 advances to block 304 in which the telematics device 102 retrieves the last location determined based on the location data received from the location beacon system 108 (i.e., the last determined location during the last location mode) from the location data database 212. In block 306, the telematics device 102 receives the sensor data from the inertial sensors (e.g., from the accelerometer 172 and from the gyroscope 174).

Subsequently, in block 308, the telematics device 102 estimates its present location based on the last determine location retrieved in block 304 and the sensor data received in block 306 using dead reckoning. For example, in block 310, the telematics device 102 may determine a velocity and a heading of the telematics device 102 based on the sensor data received in block 306. Additionally, in block 312, the telematics device 102 may estimate the present location of the telematics device 102 using a Kalman filter of the Kalman filter unit 228. To do so, the telematics device 102 utilizes the velocity and heading determined in block 310 and the last determined location retrieved in block 304 as inputs to the Kalman filter. Additionally, in block 314, the telematics device 102 determines an error (e.g., a "covariance") of the estimated location of the telematics device 102. It should be appreciated that the error of the estimated location increase over time, as well as in relation to particular characteristics of the telematics device 102/vehicle 104 such as the speed of the vehicle 104. As such, the longer telematics device 102 remains in the location mode the greater the error becomes.

Subsequently, in block 316, the telematics device 102 determines whether the communication processor 140 has been switched to the location mode. If not, the method 300 advances to block 318 in which the telematics device 102 continues to receive the sensor data from the inertial sensors (e.g., from the accelerometer 172 and from the gyroscope 174). In block 320, the telematics device updates the its estimated location based on the last estimated location (as initially determined in block 308 or in block 320 during subsequent iterations) and the sensors data received in block 318 using dead reckoning. To do so, in block 322, the telematics device 102 again determines a present velocity and heading of the telematics device 102 based on the sensor data received in block 318 and estimates the present location of the telematics device 102 using a Kalman filter of the Kalman filter unit 228 in block 324. As discussed above, the telematics device 102 utilizes the velocity and heading determined in block 318 and the last estimated location of the telematics device 102 as inputs to the Kalman filter. In block 326, the telematics device 102 again determined the present error of the estimated location of the telematics device 102.

After the estimated location of the telematics device 102 has been updated in block 320, the method 300 loops back to block 316. Again, in block 316, the telematics device 102 determines whether the communication processor 140 is in the location mode. If so, the method 300 advances to block 328 in which the estimated location and error are reported.

For example, the estimated location and error may be stored in the location data database 212. It should be appreciated, however, the estimated location of the telematics device 102 may also be stored, reported, or otherwise provided to the applications 230 or other devices of the telematics device 102 during execution of the method 300 (i.e., while the communication processor 150 is in the location mode).

Figure 4:
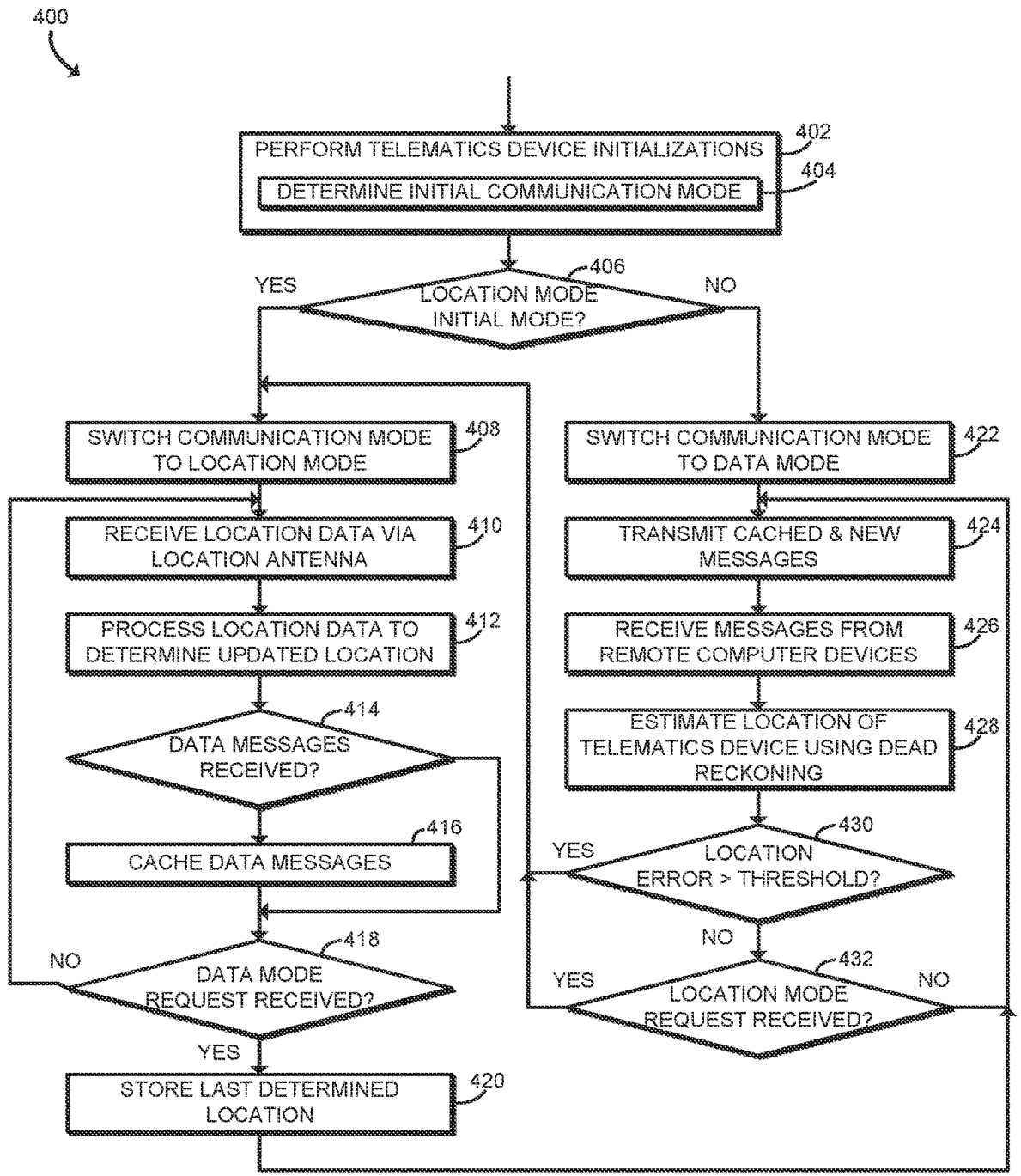
FIG. 4 is a simplified flow diagram of at least one embodiment of a method for switching communication modes of the telematics device of FIG. 1

As discussed above, the communication subsystem 132 is configured to switch the communication processor 140 between the location mode and data mode based on a particular switching scheme. For example, in some embodiments, the communication subsystem 132 may be configured to switch the communication processor 140 between the location mode and data mode based on requests received from an application 230 executed on the telematics device 102 or other source of the telematics device 102 (e.g., via a firmware call). To do so, as shown in FIG. 4, the telematics device 102 may execute a method 400 for switching communication modes. It should be appreciated that, in some embodiments, the operations of the method 400 may be performed by one or more components of the environment 204 of the telematics device 104 as shown in FIG. 2.

The method 400 begins with block 402, in which the telematics device 102 may perform various initializations procedures. For example, the telematics device 102 may load an operating system and/or various software or software extensions in block 302 as part of a power-up cycle. In the illustrative embodiment, in block 404, the telematics device 102 determines an initial communication mode in which the communication processor 140 is to be set during initialization. To do so, in the illustrative embodiment, the telematics device 102 may store a configuration profile that dictates the initial communication mode; however in other embodiments, the telematics device 102 may determine the initial communication mode based on various criteria (e.g., the present need for location or data services). In the illustrative embodiment, the configuration profile of the telematics device 102 dictates the initial state as the location mode so that the telematics device 102 may properly acquire the location signals from the location beacon system 108 and initially "lock" onto its present location.

After the telematics device 102 has performed the initialization procedures of block 402, the method 400 advances to block 406 in which the telematics device 102 determines whether the initial communication mode is the location mode (e.g., as set forth in the configuration profile). If so, the method 400 advances to block 408 in which the telematics device 102 (e.g., the communication subsystem 132) switches the communication mode of the communication processor 140 to the location mode. In response, in block 410, the communication processor 140 receives location data from the location beacon system 108 and processes the location data, in block 412, to determine the present location of the telematics device 102 and/or provide navigation functionality to the telematics device 102 as discussed above.

In block 414, telematics device 102 determines whether a data message has been received from an application 230 executed on the telematics device 102 (or from another source on the telematics device 102). If so, because the communication processor 140 is in the location mode, the telematics device 102 caches the received data message in the stored data database 210 in block 416 for later transmission during the next data mode. Subsequently, in block 418, the telematics device 102 determines whether a request to switch to the data mode has been received. For example, an application 230 executed on the telematics device 102 may request the switching of the communication processor 140 to the data mode. If so, the method 400 loops back to 410 in which the communication processor 140 continues to receive location data from the location beacon system 108. If, however, a data mode request has been received in block 418, the method 400 advances to block 420 in which the telematics device stores the last (i.e., most recent) determined location in the location data database 212.

After the telematics device has stored the last determined location in block 420, the method 400 advances to block 422 in which the telematics device 102 (e.g., the communication subsystem 132) switches the communication mode of the communication processor 140 to the data mode. Subsequently, in block 424, the communication processor 140 transmits any data messages that have been cached in the stored data database 210 during the last location mode, as well as any new data messages received from any application 230 (or other source) of the telematics device 102, to the designated remote computer system(s) 106 as discussed above. Additionally, in block 426, the communication processor 140 receives and processes data messages from the remote computer(s) 106.

In block 428, the telematics device 102 estimates the present location of the telematics device 102 (and, therefore, the vehicle 104) using dead reckoning. To do so, the telematics device 102 may execute the method 300 described above to determine an estimated location and error of the estimated location based on the last determined/estimated location and sensor data from the accelerometer 172 and the gyroscope 174 (and, in some embodiments, the magnetometer 176). Subsequently, in block 430, the telematics device determines whether the error associated with the estimated location is greater than a reference threshold. As discussed above, the error of the estimated location may increase over time and according to related characteristics of the telematics device (e.g., the speed on the vehicle 104). If the telematics device 102 determines that the error of the estimated position is greater than the reference threshold level, the method 400 advances to block 408 in which the telematics device 102 (e.g., the communication subsystem 132) switches the communication mode of the communication processor 140 back to the location mode such that the location of the telematics device 102 may be updated with location data from the location beacon system 108. In this way, the accuracy of the estimated location of the telematics device 102 (and the vehicle 104) is maintained within a predetermined error tolerance.

If, however, the error of the estimated location is within the error tolerance (i.e., less than the threshold), the method 400 advances to block 432. In block 432, the telematics device 102 determines whether a request to switch to the location mode has been received. For example, an application 230 executed on the telematics device 102 may request the switching of the communication processor 140 to the location mode. If so, the method 400 advances to block 408 in which the telematics device 102 (e.g., the communication subsystem 132) switches the communication mode of the communication processor 140 back to the location mode such that the location of the telematics device 102 may be updated with location data from the location beacon system 108 as discussed above. However, if no request to switch to the location mode has been received, the method 4500 loops back to block 424 in which the communication processor 140 transmits any cached or new data messages to the designated remote computer systems 106.

Figure 5:
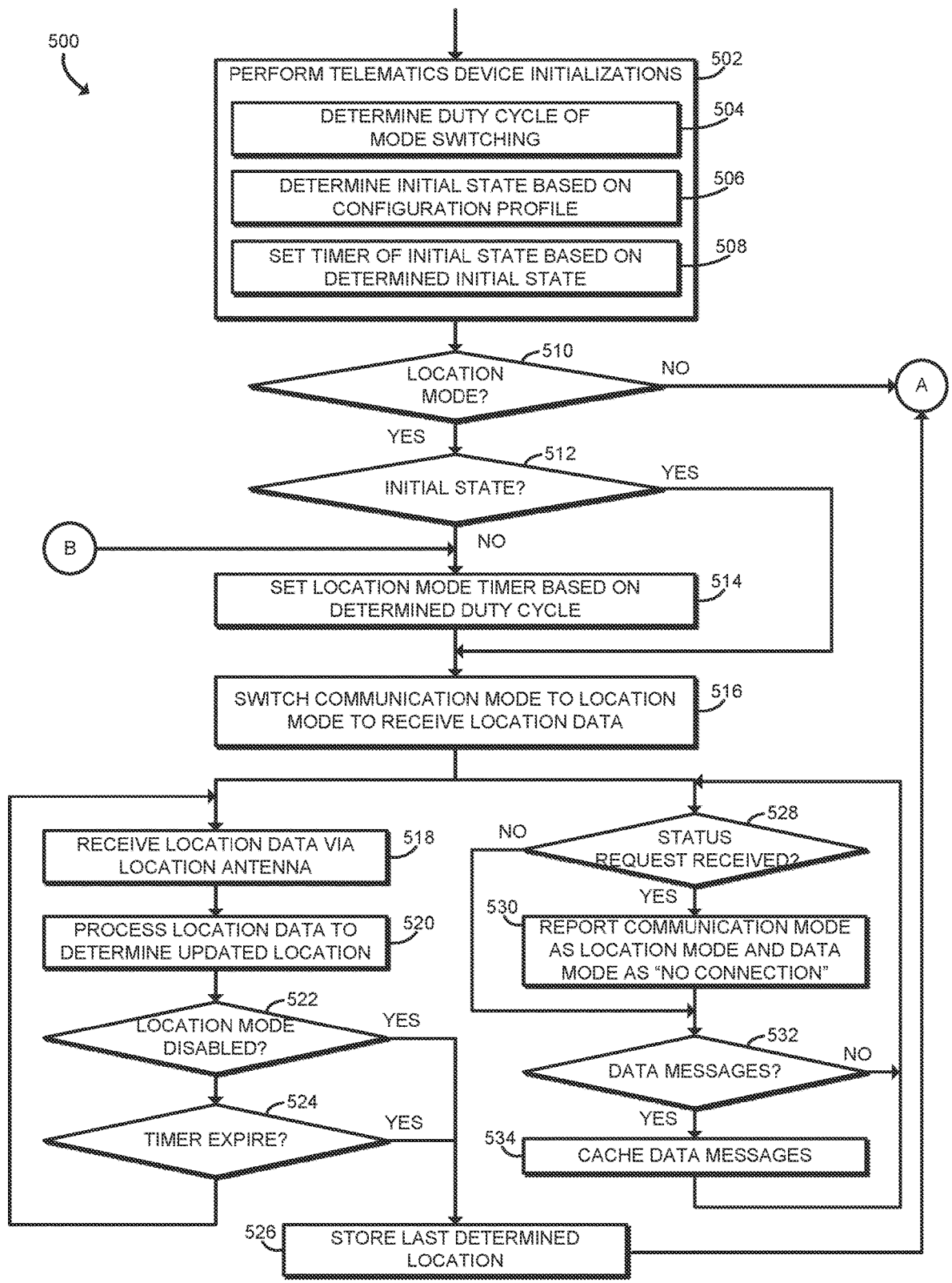
Figure 6:
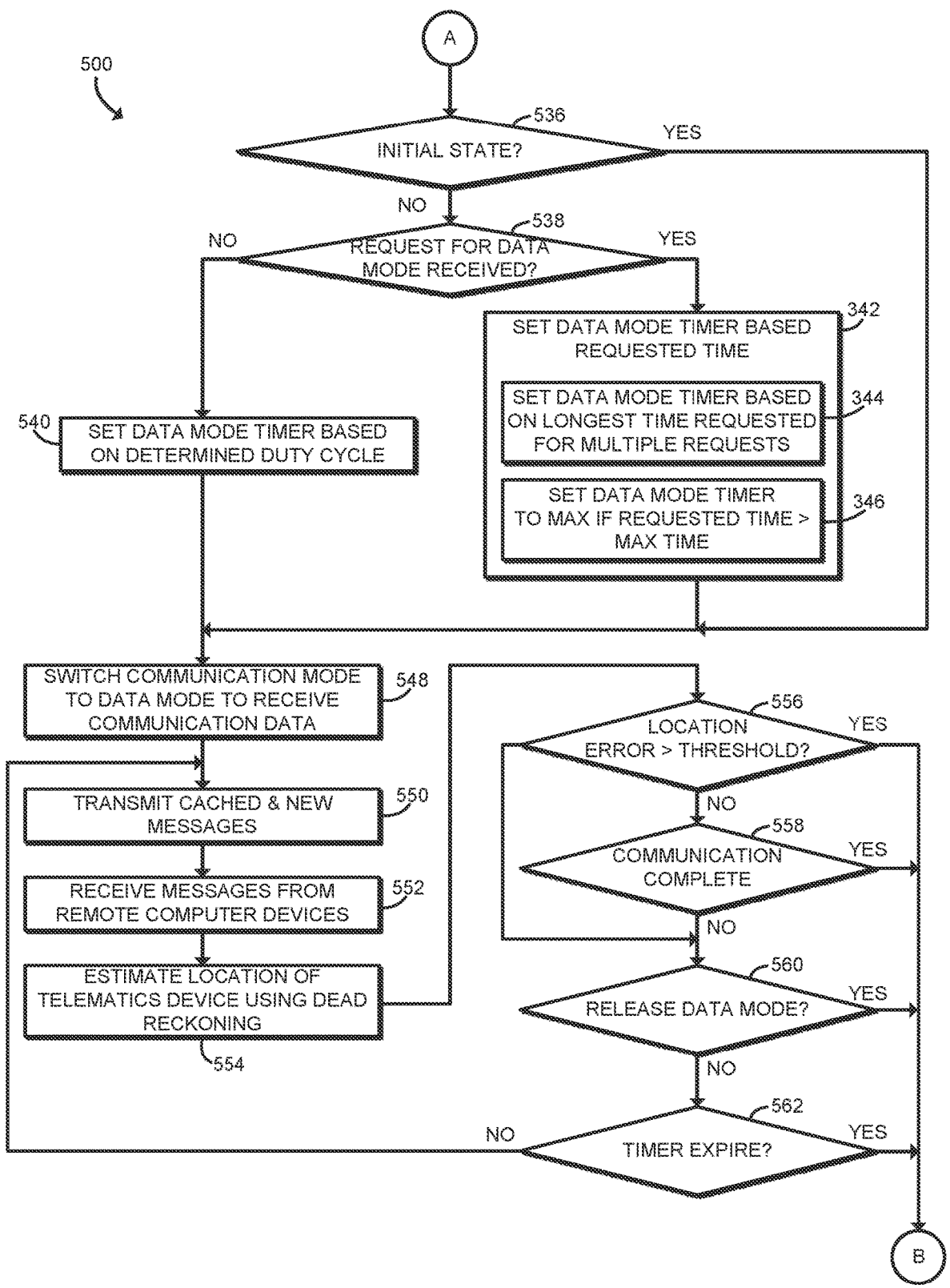

Referring now to FIGS. 5 and 6, in other embodiments the communication subsystem 132 may be configured to switch the communication processor 140 between the location mode and data mode based on a determined switching duty cycle. To do so, in use, the telematics device 102 may execute a method 500 for switching communication modes. It should be appreciated that, in some embodiments, the operations of the method 500 may be performed by one or more components of the environment 204 of the telematics device 104 as shown in FIG. 2.

The method 500 begins with block 502, in which the telematics device 102 may perform various initializations procedures. For example, the telematics device 102 may load an operating system and/or various software or software extensions in block 502 as part of a power-up cycle. In the illustrative embodiment, in block 504, the telematics device 102 determines a switching duty cycle of the various communication modes of the communication processor 140. The switching duty cycle may be determined based on various criteria such as the availability and accuracy of the location data received from the location beacon system 108, the requirements of various applications 230 executed on the telematics device 102, and/or other criteria. In some illustrative embodiments, the telematics device 102 selects a duty cycle providing priority to the location mode (e.g., >50% duty cycle) such that the accuracy of the location of the telematics device 102 is maintained. For example, in one illustrative embodiment, the telematics device 102 may select an 80% location mode-20% data mode duty cycle (e.g., 120 seconds in location mode and 20 seconds in data mode).

In block 506, the telematics device 102 determines an initial communication mode in which the communication processor 140 is to be set during initialization. To do so, in the illustrative embodiment, the telematics device 102 may store a configuration profile that dictates the initial communication mode as discussed above; however in other embodiments, the telematics device 102 may determine the initial communication mode based on various criteria (e.g., the present need for location or data services). In the illustrative embodiment, the configuration profile of the telematics device 102 dictates the initial state as the location mode so that the telematics device 102 may properly acquire the location signals from the location beacon system 108 and initially "lock" onto its present location, which can take longer than a single duty cycle allows (e.g., 120 seconds).

In block 508, the telematics device 102 sets the timer for the mode switching of the determined initial state based on that selected initial state. For example, again in the illustrative embodiment, the telematics device 102 initially sets the timer for the initial state of the location mode to an amount greater than the duty cycle dictates (e.g., greater than 120 seconds) to allow additional time for the initial location of the telematics device 102 to be determined. Alternatively, in other embodiments, the telematics device 102 may initially set the timer to a different amount for the data mode should the data mode be selected as the initial communication mode (e.g., to allow the transmission of important initial data messages).

After the telematics device 102 has performed the initialization procedures of block 502, the method 500 advances to block 510 in which the telematics device 102 determines whether the communication processor 140 is to begin in the location mode (e.g., based on the configuration profile). If so, the method 500 advances to block 512 in which the telematics device 102 determines whether the telematics device 102 is in the initialization state and, as such, the timer for the location mode has already been set to the initial timer length. If not, the method 500 advances to the block 514 in which the telematics device 102 sets the timer of the location mode to an amount based on the previously determined duty cycle. For example, if the determined duty cycle is an 80% location mode-20% data mode duty cycle, the telematics device 102 may set the timer of the location mode to 120 seconds (or other value that satisfies the selected duty cycle).

After the telematics device 102 has set the timer for the location mode in block 514 or if the telematics device 102 is determined to be in the initialization state in block 512, the method 500 advances to block 516. In block 516, the telematics device 102 (e.g., the communication subsystem 132) switches the communication mode of the communication processor 140 to the location mode. In response, in block 518, the communication processor 140 receives location data from the location beacon system 108 and processes the location data, in block 520, to determine the present location of the telematics device 102 and/or provide navigation functionality to the telematics device 102 as discussed above.

In block 522, the telematics device 102 determines whether a request to disable the location mode has been received. For example, an application 230 may request the location mode be disabled for some period of time. If not, the method 500 advances to block 524 in which the telematics device 102 determines whether the timer for the location mode has expired. If not, the method 500 loops back to block 518 in which the communication processor 140 continues to receive location data from the location beacon system 108. However, if a request to disable location mode has been received in block 522 or if the timer of the location mode has expired in block 524, the method 500 advances to block 526 in which the telematics device 102 stores the last determined location of the telematics device 102 (and, therefore, of the vehicle 104) in the location data database 212. The method subsequently advances to block 536 of FIG. 6 discussed below.

Referring back to block 516, after the telematics device 102 has switched the communication mode of the communication processor 140 to the location mode, the method 500 also advances to block 528. As such, it should be appreciated that the blocks 528-534 may be executed contemporaneously and/or in parallel with the block 518-526. In block 528, the telematics device 102 determines whether a status request regarding the present communication mode has been received from an application 230 executed on the telematics device 102. If so, the telematics device 102 reports the present communication mode as the location mode to the requesting application 230 in block 530. Additionally, in block 530, the telematics device 102 may report the status of the data mode as "no connection," which may prompt applications 230 to await the data mode to proceed.

If no status request has been received in block 528 or after the telematics device 102 has responded to the status request in block 530, the method 500 advances to block 532. In block 532, the telematics device 102 determines whether a data message has been received from an application 230 executed on the telematics device 102 (or from another source on the telematics device 102). If so, because the communication processor 140 is in the location mode, the telematics device 102 caches the received data message in the stored data database 210 in block 534 for later transmission during the next data mode. However, in some embodiments, the telematics device 102 may be configured to switch to the data mode, regardless of the duty cycle, based on the received data message (e.g., if the data message is determined to be a high priority data message) and/or based on the volume of cached data messages.

Referring back to block 510, if the telematics device 102 determines that the initial communication mode is not the location mode or after the last determined location has been stored in block 526, the method 500 advances to block 536 of FIG. 6. In block 536, the telematics device 102 determines whether telematics device 102 is in the initialization state and, as such, the timer for the data mode has already been set to the initial timer length. If not, the method 500 advances to the block 538 in which the telematics device 102 determines whether a request for the data mode has been received from an application 230 executed on the telematics device 102. If no request for the data mode has been received, the method 500 advances to block 540 in which the telematics device 102 sets the timer of the data mode to an amount based on the determined duty cycle. For example, if the determined duty cycle is an 80% location mode-20% data mode duty cycle, the telematics device 102 may set the timer of the data mode to 30 seconds (or other value that satisfies the selected duty cycle).

If, however, the telematics device 102 determines that a request for the data mode has been received in block 538, the method 500 advances to block 542 in which the telematics device 102 sets the timer for the data mode based on a requested time identified in the data mode request. That is, each request for the data mode received from an application 230 may include a requested amount of time that the communication processor 140 is to remain the data mode, which may be greater than the time allotted based on the duty cycle. In some situations, multiple requests for the data mode may be received from multiple applications 230. In such situations, the telematics device 102 is configured to set the timer of the data mode to the longest time requested in that batch of requests in block 544. However, in block 546, the telematics device 102 may also determine if any of the requested time lengths, including the longest time requested if multiple requests are received, is greater than a maximum allowed time and, if so, set the timer for the data mode to the maximum allowed time.

After the telematics device 102 has set the timer for the data mode based on the determined duty cycle in 540, has set the timer for the data mode based on a requested time in block 542, or if the telematics device 102 is determined to be in an initialization stat in block 536, the method 500 advances to block 548. In block 548, the telematics device 102 (e.g., the communication subsystem 132) switches the communication mode of the communication processor 140 to the data mode. Subsequently, in block 550, the communication processor 140 transmits any data messages that have been cached in the stored data database 210 during the last location mode, as well as any new data messages received from any application 230 (or other source) of the telematics device 102, to the designated remote computer system(s) 106 as discussed above. Additionally, in block 552, the communication processor 140 receives and processes data messages from the remote computer(s) 106.

In block 554, the telematics device 102 estimates the present location of the telematics device 102 (and, therefore, the vehicle 104) using dead reckoning. To do so, the telematics device 102 may execute the method 300 described above to determine an estimated location and error of the estimated location based on the last determined/estimated location and sensor data from the accelerometer 172 and the gyroscope 174 (and, in some embodiments, the magnetometer 176). Subsequently, in block 556, the telematics device 102 determines whether the error associated with the estimated location is greater than a reference threshold. As discussed above, the error of the estimated location may increase over time and according to related characteristics of the telematics device (e.g., the speed on the vehicle 104). If the telematics device 102 determines that the error of the estimated position is greater than the reference threshold level, the method 500 advances to block 514 of FIG. 5 in which the telematics device 102 (e.g., the communication subsystem 132) switches the communication mode of the communication processor 140 back to the location mode such that the location of the telematics device 102 may be updated with location data from the location beacon system 108. Again, in this way, the accuracy of the estimated location of the telematics device 102 (and the vehicle 104) is maintained within a predetermined error tolerance.

If, however, the error of the estimated location is within the error tolerance (i.e., less than the threshold), the method 500 advances to block 558. In block 558, the telematics device 102 may determine whether all data communications have completed (e.g., whether a data call has ended) and, as such, data mode is no longer needed. If not, the method 500 advances to block 560 in which the telematics device 102 determines whether a request to release the data mode has been received from any application 230 executed on the telematics device 102. For example, if data communications are no longer needed, an application 230 may request that the data mode be switched to the location mode. If no such request has been received, the method 500 advances to block 562 in which the telematics device 102 determines whether the timer for the data mode has expired. If not, the method 500 loops back to block 550 in which the communication processor 140 continues to transmit data messages to the remote computer system(s) 160 and receives data messages from the remote computer system(s) 160 in block 552. However, if all data communications have completed in block 558, a request to release the data mode has been received in block 560, or if the timer of the data mode has expired in block 562, the method 500 loops back to block 514 of FIG. 5 in which the telematics device 102 again sets the timer for the location mode based on the determined duty cycle and switches the communication mode of the communication processor 140 to the location mode in block 516. In this way, the telematics device 102 periodically switches between communication modes of the communication processor 140 to effect contemporaneous data message and location services.

While the disclosure has been illustrated and described in detail in the drawings and foregoing description, such an illustration and description is to be considered as illustrative and not restrictive in character, it being understood that only illustrative embodiments have been shown and described and that all changes and modifications that come within the spirit of the disclosure are desired to be protected.

There are a plurality of advantages of the present disclosure arising from the various features of the methods, apparatuses, and systems described herein. It will be noted that alternative embodiments of the methods, apparatuses, and systems of the present disclosure may not include all of the features described yet still benefit from at least some of the advantages of such features. Those of ordinary skill in the art may readily devise their own implementations of the methods, apparatuses, and systems that incorporate one or more of the features of the present invention and fall within the spirit and scope of the present disclosure as defined by the appended claims.

The invention claimed is:

1. A telematics device comprising:
a plurality of inertial sensors configured to sense inertial characteristics of the telematics device and produce inertial sensor data indicative of the sensed inertial characteristics;
a location antenna configured for receiving location data from a location beacon system;
a data antenna configured for communications with a remote computer system; and
a communication subsystem comprising a communication processor electrically coupled to each of the data antenna and the location antenna, the communication processor having multiple modes of operation including (i) a location mode in which the communication processor is configured to receive and process location data from the location beacon system using the location antenna and (ii) a data mode in which the communication processor is configured to transmit and receive data communications from the remote computer system using the data antenna, wherein the communication subsystem is configured to control the switching of the communication processor between the location mode and the data mode;
a location determination manager configured to determine a present location of the telematics device based on the location data received from the location beacon system while the communication processor is in the location mode and to determine an estimated location of the telematics device based on a last determined present location of the telematics device and the inertial sensor data using a dead reckoning algorithm while the communication processor is in the data mode; and
a message bus manager configured to receive a request for the data mode from an application executed by the telematics device, wherein the request includes a requested duration of the data mode,
wherein the communication subsystem is configured to (i) determine whether the requested duration is greater than a maximum duration, (ii) set, in response to a determination that the requested duration is greater than the maximum duration, a timer for the data mode to the maximum duration, (iii) set, in response to a determination that the requested duration is not greater than the maximum duration, the timer to the requested duration, (iv) switch the communication processor from the location mode to the data mode for a duration of the timer and (v) switch the communication processor from the data mode to the location mode in response to a determination that an error associated with the estimated location is greater than a threshold error.

2. The telematics device of claim 1, wherein the plurality of inertial sensors include an accelerometer sensor and a gyroscope sensor.

3. The telematics device of claim 1, wherein to determine the estimated location of the telematics device comprises to determine the estimated location of the telematics device based on the last determined present location of the telematics device and the inertial sensor data using a Kalman filter while the communication processor is in the data mode, wherein to determine the estimated location using the Kalman filter includes to determine the error associated with the estimated location.

4. The telematics device of claim 1, further comprising a data communication manager configured to (i) cache messages to be transmitted to the remote computer system while the communication processor is in the location mode and (ii)

transmit, via the communication subsystem, the cached messages in response to the communication processor being switched to the data mode.

5. The telematics device of claim 1, wherein the communication subsystem is further configured to store, in response to the mode of operation of the communication processor being switched to the data mode, the determined present location of the telematics device as the last determined present location.

6. The telematics device of claim 1, wherein the communication subsystem is configured to switch the communication processor to the location mode in response to receipt of a request for the location mode from an application executed on the telematics device and to switch the communication processor to the data mode in response to receipt of a request for the data mode from the application.

7. The telematics device of claim 1, wherein to control the switching of the communication processor between the location mode and the data mode comprises to:
   determine a switching duty cycle between the location mode and the data mode of the communication processor; and
   switch the communication processor between the location mode and the data mode based on the switching duty cycle.

8. The telematics device of claim 7, wherein the duty cycle comprises a greater than 50% duty cycle for the location mode.

9. The telematics device of claim 7, wherein to switch the communication processor between the location mode and the data mode comprises to:
   set the timer for the location mode based on the switching duty cycle;
   switch the communication processor to the location mode;
   determine whether the timer for the location mode has expired; and
   in response to a determination that the timer for the location mode has expired, (i) set the timer for the data mode based on the switching duty cycle and (ii) switch the communication processor to the data mode.

10. The telematics device of claim 9, wherein to switch the communication processor between the location mode and the data mode further comprises to:
    determine whether the timer for the data mode has expired; and
    in response to a determination that the timer for the data mode has expired, (i) set the timer for the location mode based on the switching duty cycle and (ii) switch the communication processor to the location mode.

11. A telematics device comprising:
    a plurality of inertial sensors configured to sense inertial characteristics of the telematics device and produce inertial sensor data indicative of the sensed inertial characteristics;
    a location antenna configured for receiving location data from a location beacon system;
    a data antenna configured for communications with a remote computer system; and
    a communication subsystem comprising a communication processor electrically coupled to each of the data antenna and the location antenna, the communication processor having multiple modes of operation including (i) a location mode in which the communication processor is configured to receive and process location data from the location beacon system using the location antenna and (ii) a data mode in which the communication processor is configured to transmit and receive data communications from the remote computer system using the data antenna, wherein the communication subsystem is configured to control the switching of the communication processor between the location mode and the data mode;
    a location determination manager configured to determine a present location of the telematics device based on the location data received from the location beacon system while the communication processor is in the location mode and to determine an estimated location of the telematics device based on a last determined present location of the telematics device and the inertial sensor data using a dead reckoning algorithm while the communication processor is in the data mode; and
    a message bus manager configured to receive a plurality of requests for the data mode from one or more applications executed by the telematics device, wherein each request of the plurality of requests includes a requested duration of the data mode,
    wherein the message bus manager is further configured to determine a requested duration having the longest duration from the plurality of requests, and wherein the communication subsystem is further configured to set the timer for the data mode to the requested duration having the longest duration and switch the communication processor from the location mode to the data mode for a duration of the timer,
    wherein the communication subsystem is configured to switch the communication processor from the data mode to the location mode in response to a determination that an error associated with the estimated location is greater than a threshold error.

12. A method for switching between communication modes of a telematics device, the method comprising:
    receiving, from a plurality of inertial sensors, inertial sensor data indicative of inertial characteristics of the telematics device;
    switching, by a communication subsystem of the telematics device, a communication processor of the telematics device between a location mode and a data mode, wherein the communication processor has multiple modes of operation including (i) the location mode in which the communication processor is configured to receive and process location data from the location beacon system using a location antenna of the telematics device and (ii) the data mode in which the communication processor is configured to transmit and receive data communications from the remote computer system using a data antenna of the telematics device;
    determining, by the telematics device, a present location of the telematics device based on the location data received from the location beacon system while the communication processor is in the location mode;
    determining, by the telematics device, an estimated location of the telematics device based on a last determined present location of the telematics device and the inertial sensor data using a dead reckoning algorithm while the communication processor is in the data mode;
    receiving, by a message bus manager of the telematics device, a request for the data mode from an application executed by the telematics device, wherein the request includes a requested duration of the data mode;
    determining, by the telematics device, whether the requested duration is greater than a maximum duration;

setting, by the telematics device and in response to a determination that the requested duration is greater than the maximum duration, a timer for the data mode to the maximum duration;

setting, by the telematics device and in response to a determination that the requested duration is not greater than the maximum duration, the timer for the data mode to the requested duration of the data mode;

switching, by the communication subsystem, the communication processor from the location mode to the data mode for a duration of the timer; and switching, by the communication subsystem, the communication processor from the data mode to the location mode in response to a determination that an error associated with the estimated location is greater than a threshold error.

13. The method of claim 12, wherein receiving the inertial sensor data comprises receiving accelerometer data form an accelerometer sensor of the telematics device and receiving gyroscope data from a gyroscope sensor of the telematics device.

14. The method of claim 12, wherein determining the estimated location of the telematics device comprises determining the estimated location of the telematics device based on the last determined present location of the telematics device and the inertial sensor data using a Kalman filter while the communication processor is in the data mode, wherein determining the estimated location using the Kalman filter includes determining the error associated with the estimated location.

15. The method of claim 12, further comprising:

caching, by the telematics device, messages to be transmitted to the remote computer system while the communication processor is in the location mode; and transmitting, by the communication subsystem, the cached messages in response to the communication processor being switched to the data mode.

16. The method of claim 12, further comprising storing, in response to the mode of operation of the communication processor being switched to the data mode, the determined present location of the telematics device as the last determined present location.

17. The method of claim 12, wherein switching the communication processor of the telematics device between a location mode and a data mode comprises:

determining, by the telematics device, a switching duty cycle between the location mode and the data mode of the communication processor; and switching, by the communication subsystem, the communication processor between the location mode and the data mode based on the switching duty cycle.

\* \* \* \* \*